A. E. DOMVILLE.
OILLESS CAR WHEEL.
APPLICATION FILED APR. 24, 1911.

997,655.

Patented July 11, 1911.

WITNESSES
Thomas M Smith
Elisabeth A. Sheldrake

INVENTOR
Alfred E. Domville,
BY
J. Walter Douglas.
ATTORNEY

UNITED STATES PATENT OFFICE.

ALFRED E. DOMVILLE, OF PHILADELPHIA, PENNSYLVANIA.

OILLESS CAR-WHEEL.

997,655.   Specification of Letters Patent.   Patented July 11, 1911.

Application filed April 24, 1911. Serial No. 622,869.

*To all whom it may concern:*

Be it known that I, ALFRED E. DOMVILLE, a citizen of the United States, residing at Philadelphia, in the county of Philadelphia and State of Pennsylvania, have invented certain new and useful Improvements in Oilless Car-Wheels, of which the following is a specification.

My invention has relation to an oilless car wheel with a hub and sectional bushings, respectively having inside and outside surfaces differing in density or hardness in respect to that of the axle upon which said bushings are mounted and the latter on the wheel-hub and said bushings independently revolving on the axle lessening friction to such an extent as to render lubrication of the wheel-bearings unnecessary in use. According to my defined invention in practice it has been found in over a year's use of such type of wheel-bearings without lubrication scarcely any perceptible sign of wear of either the bushings or hub was occasioned which is due to the practically frictionless working of said members in their respective independent relations associated with each other.

The nature and scope of my present invention will be more fully understood from the following description taken in connection with the accompanying drawings forming part hereof, in which—

Figure 2:
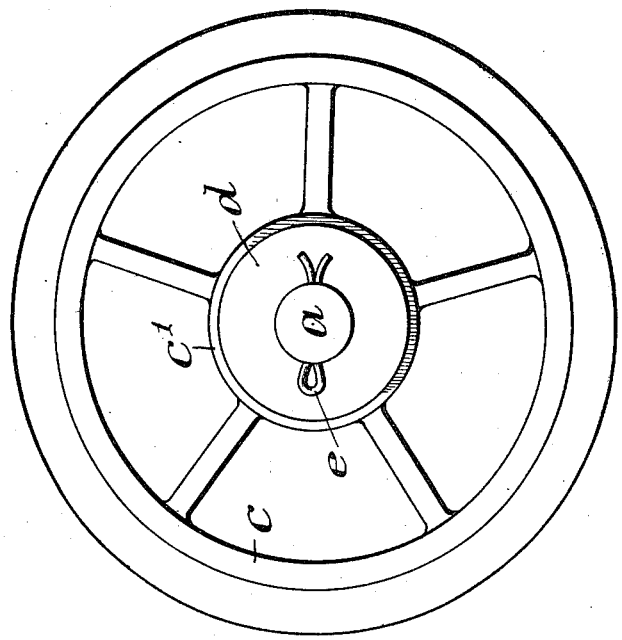
Figure 1:
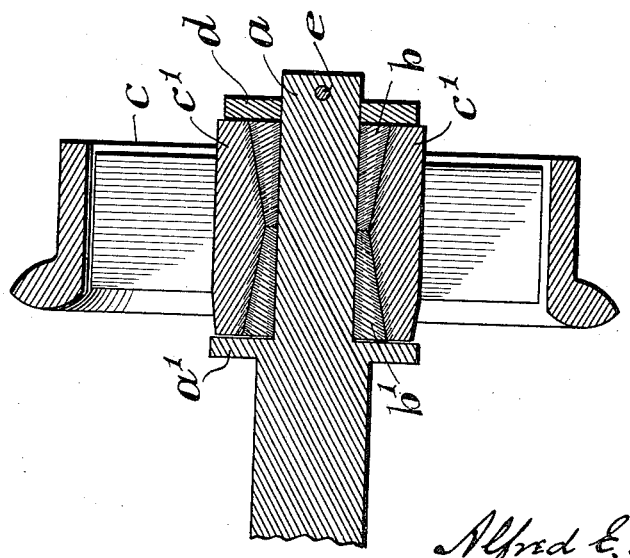

Figure 1, is a vertical sectional view through a wheel, embodying main features of my said invention; and Fig. 2, is a front end view of the wheel, with the several parts shown assembled, for operative use.

Referring to the drawings, $a$ is a wheel-axle provided with a rear integral flange $a^1$. $b$ and $b^1$, as shown are two truncated cone-shaped bushings provided with hardened inner and outer surfaces or of inherently greater density of metal than the metal of the axle and on which the sectional bushings $b$ and $b^1$, are loosely mounted to revolve, independent of said axle $a$, $c$, is the wheel having a hub $c^1$, the bearing surface of which is of greater density or hardness than the wheel and which hub revolves freely on said bushings independently of the same. The said smooth, hard wearing surface of the hub $c^1$, is presented to corresponding smooth, hard wearing surfaces of the bushings $b$ and $b^1$, and also to the axle $a$, and each is movable independently of the other in practical use so that friction is more uniformly distributed, and hence, as practice has demonstrated, lubrication is unnecessary.

$d$, is a metal washer detachably applied to the axle $a$, beyond the wheel in position as clearly shown in Fig. 2.

$e$, is a cotter or other type of pin introduced through an opening provided in the front portion of the axle to hold the washer $d$, and wheel and other members thereof in proper operative position on the axle.

Having thus described the nature and object of my invention, what I claim as new and desire to secure by Letters Patent is:—

An oilless car-wheel having an axle, sectional bushings loosely mounted on the axle, said bushings arranged independently of each other on the axle having hardened interior and exterior surfaces to offer smooth, hard wearing surfaces to the axle and corresponding smooth, hard wearing surfaces to the wheel-hub and said bushings revolving loose on the axle and the wheel-hub thereby lessening friction of said members in their operative arrangement, to such an extent as to render lubrication unnecessary in use.

In witness whereof, I have hereunto set my signature, in the presence of two subscribing witnesses hereto.

ALFRED E. DOMVILLE.

Witnesses:
J. WALTER DOUGLASS,
THOMAS M. SMITH.

Copies of this patent may be obtained for five cents each, by addressing the "Commissioner of Patents, Washington, D. C."